United States Patent
Lin et al.

(10) Patent No.: US 11,023,994 B2
(45) Date of Patent: Jun. 1, 2021

(54) AUTO-FOCUS ENGINE ARCHITECTURE FOR IMAGE SIGNAL PROCESSOR

(71) Applicant: Apple Inc., Cupertino, CA (US)

(72) Inventors: Sheng Lin, San Jose, CA (US); David R. Pope, Fremont, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 16/376,414

(22) Filed: Apr. 5, 2019

(65) Prior Publication Data

US 2020/0320661 A1 Oct. 8, 2020

(51) Int. Cl.
*H04N 5/232* (2006.01)
*G06T 1/20* (2006.01)
*H04N 5/247* (2006.01)

(52) U.S. Cl.
CPC ........... *G06T 1/20* (2013.01); *H04N 5/23212* (2013.01); *H04N 5/247* (2013.01)

(58) Field of Classification Search
CPC ....... H04N 5/23212; H04N 5/247; G06T 1/20
USPC .......................................................... 348/350
See application file for complete search history.

(56) References Cited

U.S. PATENT DOCUMENTS

| | | | |
|---|---|---|---|
| 8,913,040 B2 | 12/2014 | White et al. | |
| 9,124,823 B2 | 9/2015 | Dai et al. | |
| 9,456,141 B2 | 9/2016 | Fishman et al. | |
| 9,497,397 B1 | 11/2016 | Kleekajai et al. | |
| 2006/0268180 A1* | 11/2006 | Chou ....................... | H04N 5/58 348/673 |
| 2008/0056704 A1* | 3/2008 | Ovsiannikov ............ | G03B 7/08 396/234 |
| 2017/0090149 A1* | 3/2017 | Galor Gluskin ... | H04N 5/36961 |

* cited by examiner

*Primary Examiner* — Usman A Khan
(74) *Attorney, Agent, or Firm* — Fenwick & West LLP

(57) ABSTRACT

Embodiments relate to image signal processors (ISP) that include one or more auto-focus circuits. Each of the auto-focus circuits may be connected to an image sensor and may be separate from a statistics circuit and other image processing pipelines of the ISP. An image sensor may include one or more focus pixels that are used to generate data for auto-focusing. The auto-focus circuit may extract the focus pixel values and generate a signal to control the lens position of the image sensor. Each image sensor may include a separate auto-focus circuit. When other image processing pipelines of the ISP are processing the image data from one image sensor, the auto-focus circuit for another image sensor may continue to generate focus signals that control the lens position of the other image sensor. The other image sensor may be in standby but may continue to remain in focus.

20 Claims, 6 Drawing Sheets

AUTO-FOCUS ENGINE ARCHITECTURE FOR IMAGE SIGNAL PROCESSOR

BACKGROUND

1. Field of the Disclosure

The present disclosure relates to a circuit for processing images and more specifically to an auto-focus circuit of an image signal processor.

2. Description of the Related Art

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

An electronic device may include multiple image sensors that serve different functions such as capturing images and videos and performing facial recognition. The image sensors are often associated with lenses and suitable optical components for capturing images of objects at different distances. Auto-focusing relates to adjusting the lens position of an image sensor using a processor. The processing of focus related data could occupy significant resources of the electronic device. Also, the speed of an image sensor to adjust its focus may affect user experience in using an electronic device.

SUMMARY

Embodiments relate to an image signal processor that includes circuitry for auto-focusing of an image sensor. An auto-focus circuit may be operably coupled to the image sensor to receive raw image data captured by the image sensor. The auto-focus circuit may determine a phase shift among focus pixel values in the raw image data. The focus pixel values represent pixel values from the focus pixels of the image sensor. Based on the phase shift, the auto-focus circuit may generate a signal that is sent to the image sensor to change the lens position of the image sensor. The image signal processor may include a statistics circuit separate from the auto-focus circuit. The statistics circuit may obtain statistical information on the raw image data by processing the raw image data.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to image signal processors (ISP) that include one or more auto-focus circuits that are separate from a statistics circuit and other image processing pipelines of the ISP. An image sensor may include one or more focus pixels that are used to generate data for auto-focusing. The auto-focus circuit may extract the focus pixel values to generate a signal to control the lens position of the image sensor based on the phase shift of the focus pixels. The auto-focus circuits may also include circuits that generate exposure statistics of the image sensors. Each image sensor may be connected to a separate auto-focus circuit. The separation of the auto-focus circuits from other image processing pipelines may allow continuous processing of focus data without impacting the performance of other pipelines.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
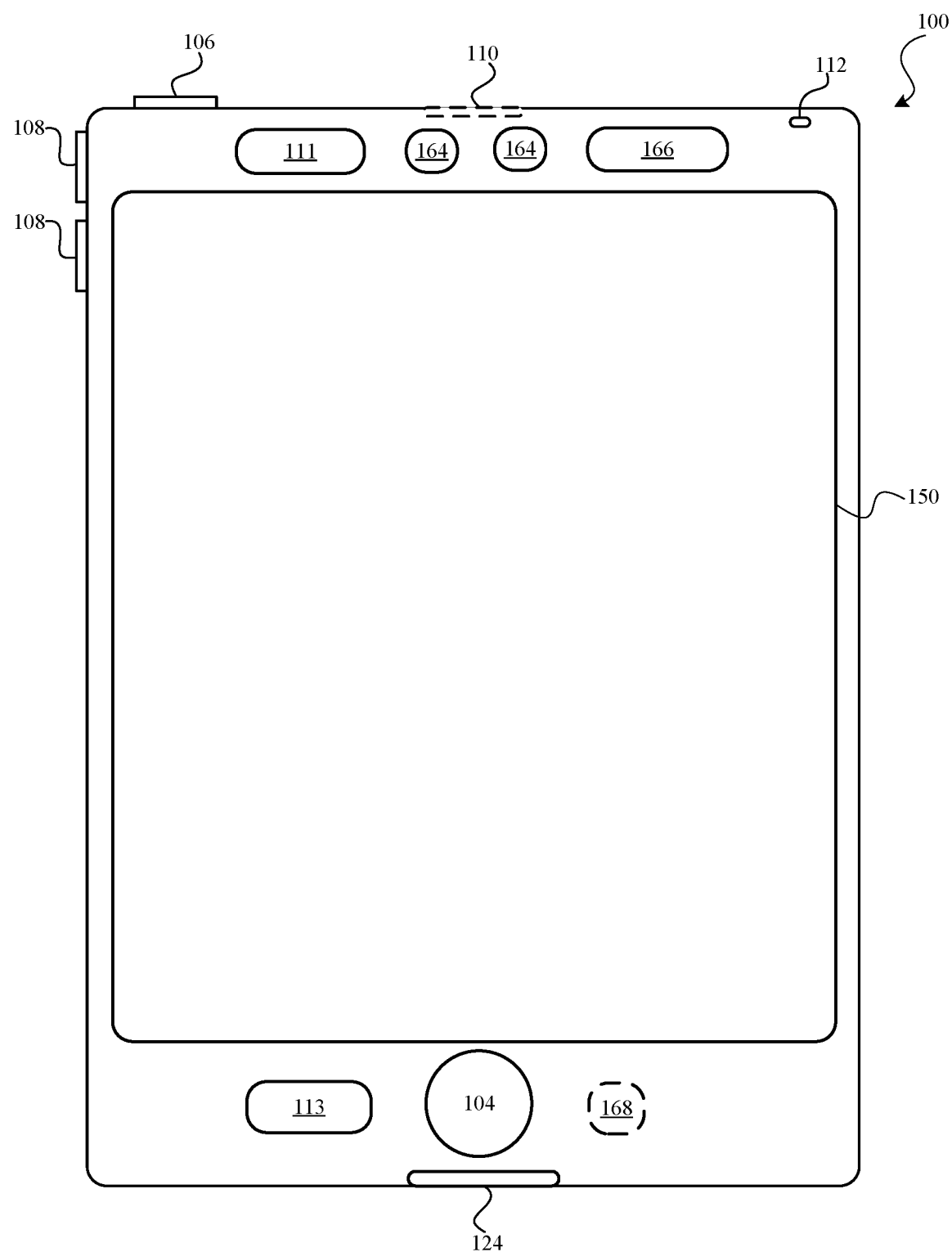
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
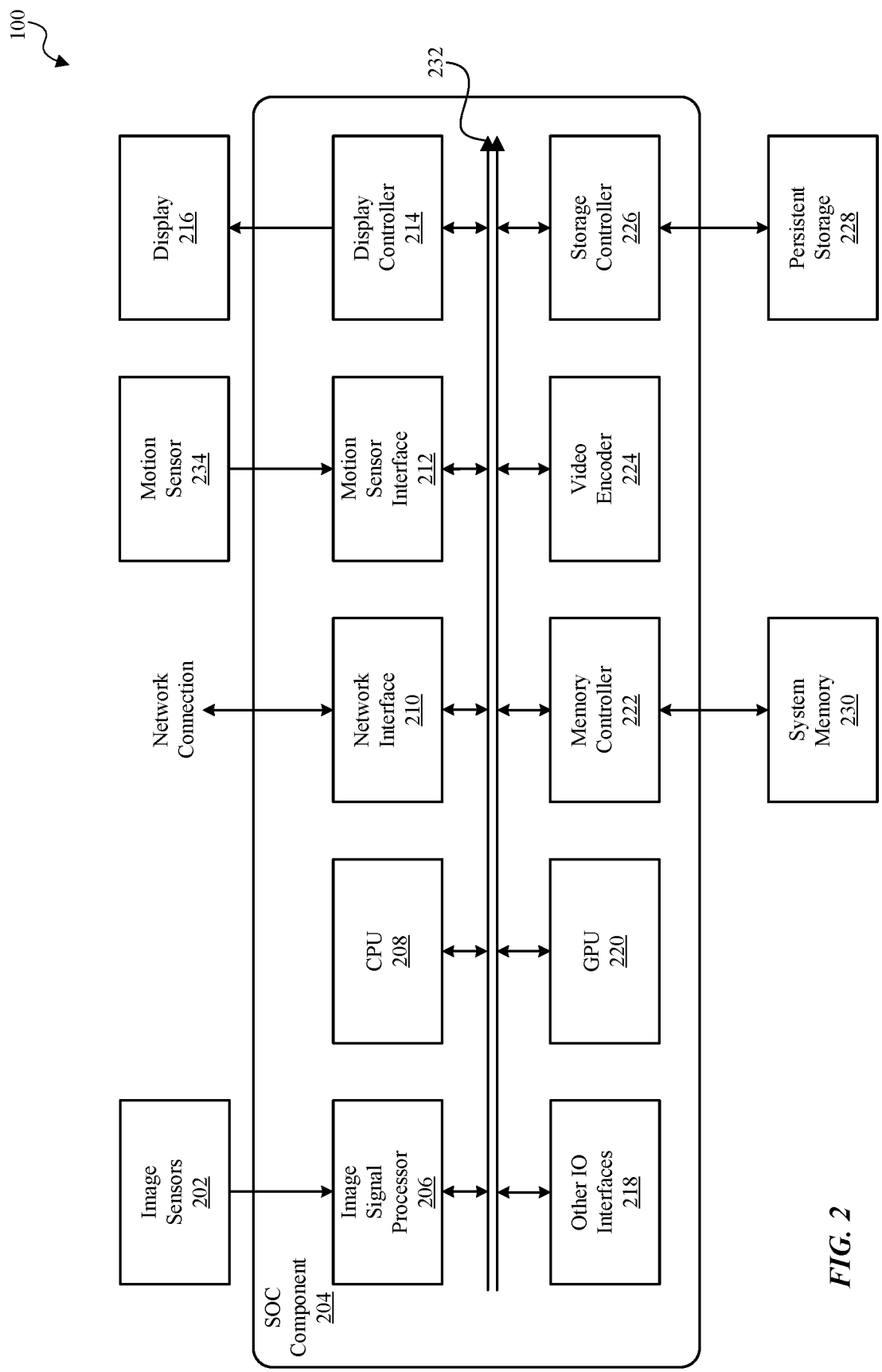
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. Image data in a Bayer pattern or other patterns that have a monochromatic color value for each pixel may be referred to as "raw image data" herein. An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
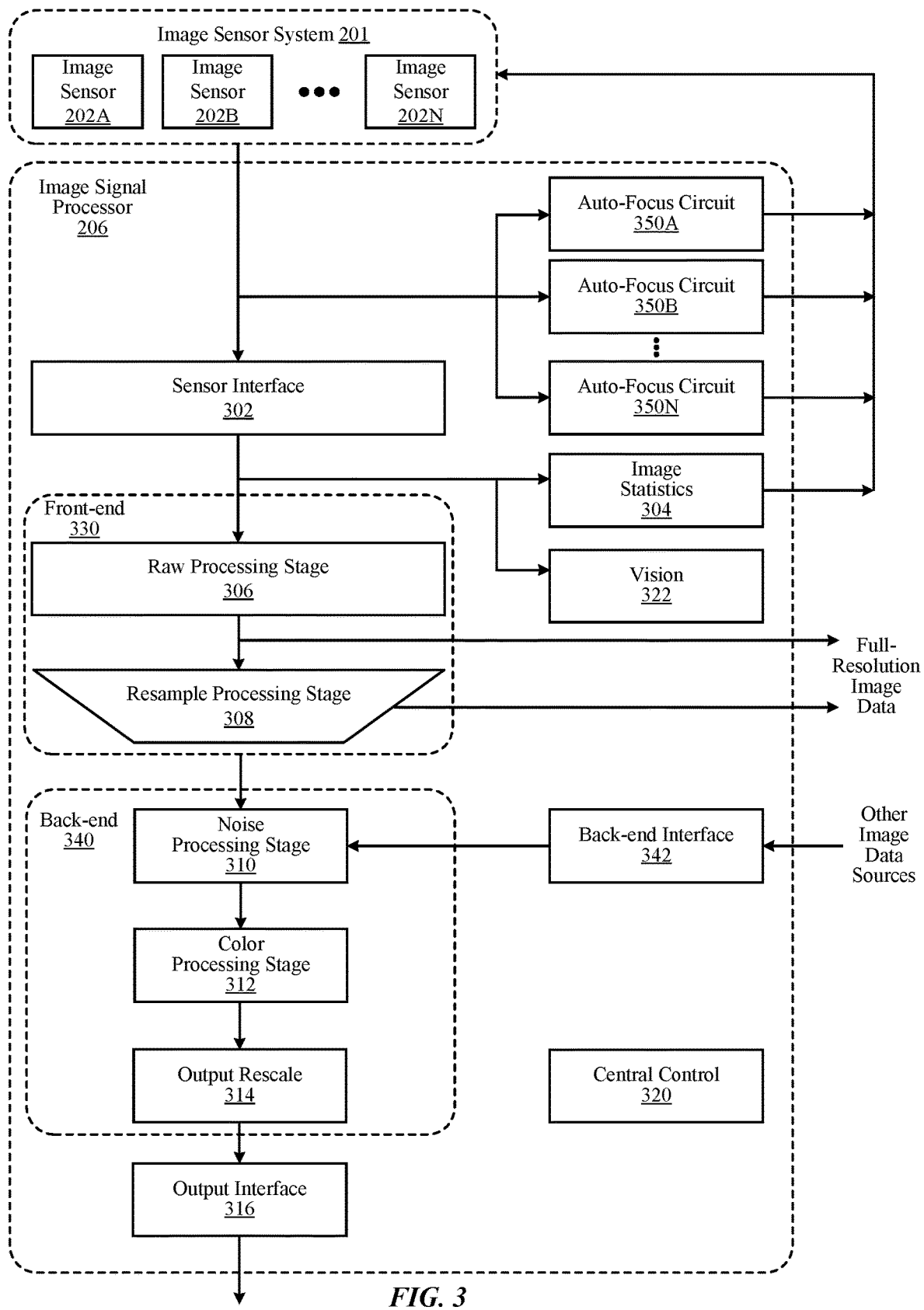
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 processes 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuits that analyze raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing the noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional input coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Image Sensors

Figure 4:
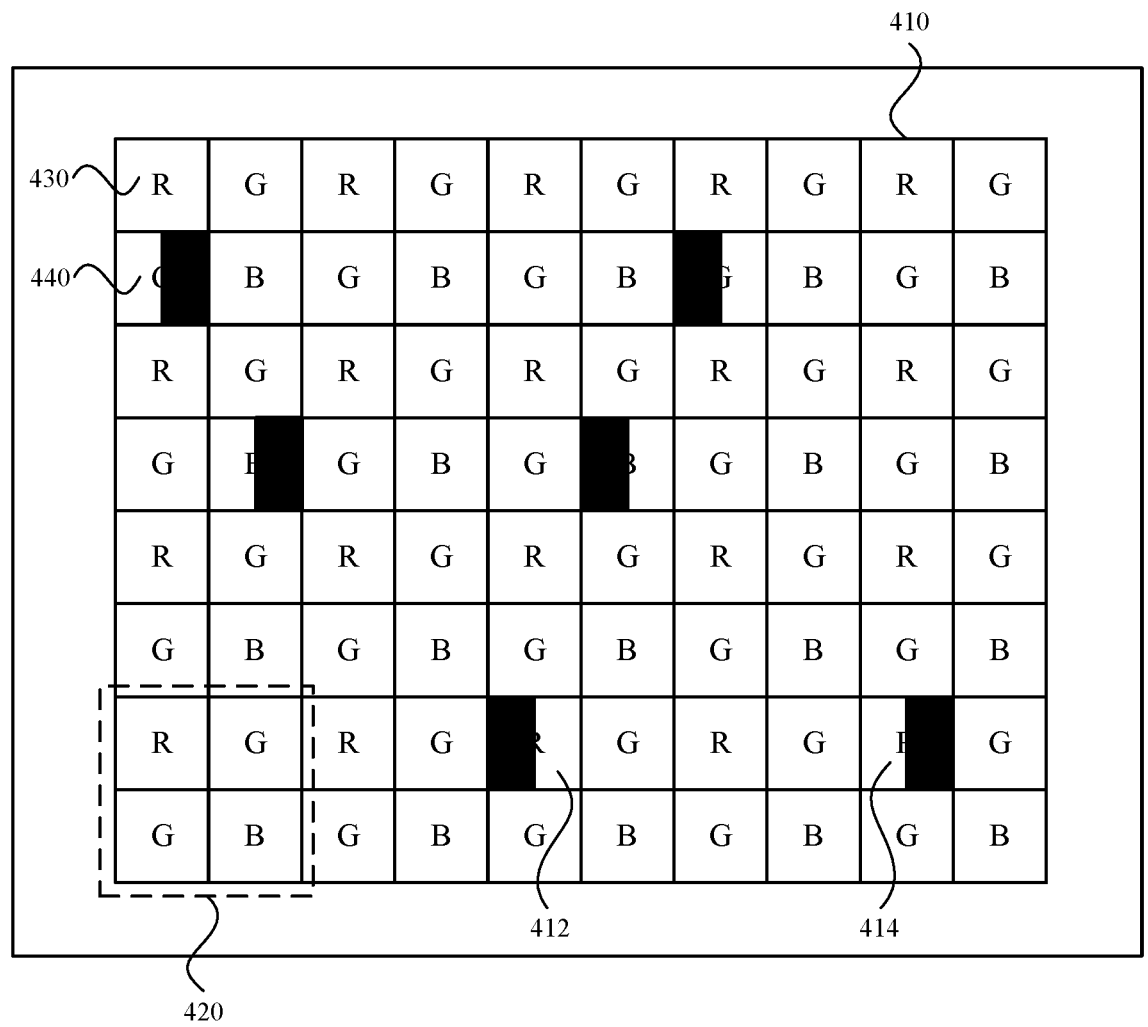
FIG. 4 is a conceptual diagram illustrating an example image sensor, according to one embodiment.

FIG. 4 is a conceptual diagram illustrating an example image sensor 202, according to one embodiment. The image sensor 202 includes a plurality of image sensing units 410 (also referred to as "active pixel sensors," "image sensing pixels," or simply "pixels"), as described above with reference to FIG. 2. Each image sensing unit 410 may detect light of a particular wavelength or range of wavelength. In FIG. 4, each individual image sensing unit 410 is represented by a square with a letter that represents the color that the image sensing unit is designed to detect. For example, an image sensing unit 410 with the letter "G" represents an image sensing unit that detects green light. Letter "R" represents an image sensing unit that detects red light, and "B" represents an image sensing unit that detects blue light. While the image sensor 202 shown in FIG. 4 includes image sensing units 410 that are designed to detected red, green and blue light, in other embodiments an image sensor 202 may also include other types of image sensing units 410 that detect visible light or other electromagnetic waves of different wavelengths.

The image sensing units 410 may be arranged in a specific pattern. In the example of FIG. 4, a pattern of four pixels 420 in a square format (referred to as a "pixel quad") are repeated in both horizontal and vertical directions. The specific arrangement of FIG. 4 is referred to as a Bayer format and the pixel quads having this arrangement may be referred to as Bayer quads. In various embodiments, other variations of Bayer formats or changes in the positions of image sensing units 410 in different colors may also be used. For example, the top left and bottom right corners of a quad may include green pixels.

The image sensing units 410, which can also be referred to as pixels of the image sensor 202, may include different types of pixels. For example, the image sensing units 410 may include image pixels 430 and focus pixels 440. Image pixels 430 are image sensing units 410 that generate image data values for the electronic device 100 to form an image. Focus pixels 440 generate image data values for auto-focus circuits 350 in the electronic device 100 to determine a focus position of an image sensor 202. In some embodiments, the focus pixels 440 or the image pixels 430 may serve dual purposes for both forming an image and providing auto-focus data. In other embodiments, the focus pixels 440 and the image pixels 430 may have their own respective specialized roles. In the embodiment shown in FIG. 4, the focus pixels 440 are shown as square boxes that have half of the pixels covered (e.g., pixels 412 and 414). The image pixels 430 are shown as square boxes without any cover. In various embodiments, the focus pixels 440 may be distributed in various locations and patterns. A portion of each focus pixel 440 may be blocked from light exposure, which is illustrated in FIG. 4 as the focus pixels 440 being partially covered. The portion of the focus pixel 440 being blocked may be located in the left, right, top, bottom, diagonal, or any other areas, symmetric or asymmetric, regular or irregular, and equally divided or not, of the focus pixel. Different focus pixels may be blocked in different portions. For example, a first focus pixel 412 may have a first portion (shown as, e.g., the left side) blocked from light exposure while a second focus pixel 414 may have a second portion (shown as, e.g., the right side) block from light exposure. The second portion blocked in the second focus pixel 414 may be different from a corresponding portion blocked in the first focus pixel 412. The blocking of different corresponding portions of the focus pixels allows the focus pixel to capture images from slightly different angles compared to nearby focus pixels. In turn, an auto-focus circuit 350 may determine auto-focus data based on pixel values transmitted from the focus pixels in a manner that will be discussed in further detail in FIG. 5.

By way of example, the electronic device 100 may have a dual camera system that has a first image sensor 202A equipped with a wide-angle lens and a second image sensor 202B equipped with a telephoto lens. The two image sensors 202A, 202B with different focal lengths cooperate to capture images and videos. Depending on the distances of the objects captured by the image sensors 202, the ISP 206 may process the raw image data from one of the image sensors 202 and to display the processed images on the touch screen 150. The image sensor 202 that is transmitting raw image data to other pipelines of ISP 206 is an active image sensor while another image sensor 202 is in standby. The auto-focus circuit 350 connected to the standby image sensor 202 continues to generate focus signals 592 to keep the standby image sensor 202 remain in focus. When the electronic device 100 switches the images displayed on the touch screen 150 to the processed images captured by the standby image sensor 202, the standby image sensor 202 may immediately generate raw image data in focus to other image processing pipelines of the ISP 206 without delay.

Example Auto-Focus Circuit Pipelines

Figure 5:
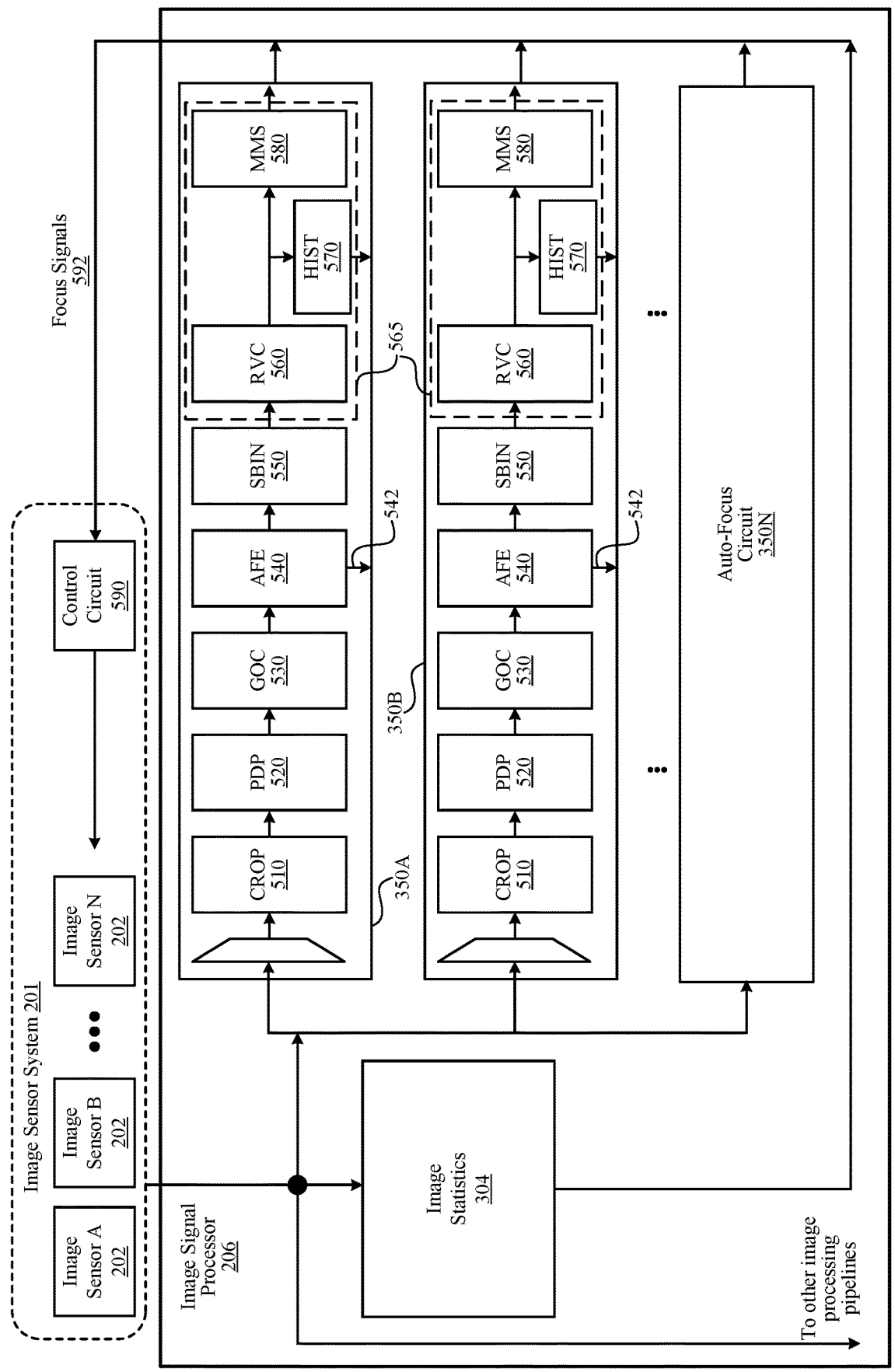
FIG. 5 is a block diagram illustrating an example auto-focus pipeline of an image signal processor, according to one embodiment.

FIG. 5 is a block diagram illustrating auto-focus circuit pipelines of an image signal processor (ISP) 206, according to one embodiment. For simplicity, various components of the ISP 206, such as the sensor interface 302, front-end 330, back-end 340, and output interface 316 (which are shown in FIG. 3), are not shown in FIG. 5 except an arrow indicating image data may be sent to other image processing pipelines. The ISP 206 includes one or more auto-focus circuits 350A through 350N (collectively referred to as "auto-focus circuits 350" or referred individually as "auto-focus circuits 350"). Each of auto-focus circuits 350A through 350N may be operably coupled to an image sensor 202 that transmits raw image data captured by the image sensor. In one embodiment, the number of auto-focus circuit 350 may correspond to the number of image sensors 202 in the electronic device 100 so that each image sensor 202 has its own auto-focus circuit 350. In another embodiment, the number of auto-focus circuit 350 may correspond to the number of a particular type of image sensors 202, for example, the number of cameras in the electronic device 100. In other embodiments, multiple image sensors 202 may share one auto-focus circuits 350.

The ISP 206 may include a statistics circuit such as the image statistics circuit 304 that is separate from each of the auto-focus circuits 350. The statistics circuit 304 may obtain statistical information on the image data generated by the image sensors 202, as described above with reference to FIG. 3.

The auto-focus circuits 350 are circuits that generate focus signals 592 based on image data captured by the image sensors 202 to change the lens position of the image sensors 202. The auto-focus circuits 350 are separate and distinct from the image statistics circuit 304. An auto-focus circuit 350 may be operably coupled to an image sensor 202 to receive raw image data captured by the image sensor 202. The auto-focus circuit 350 may also be coupled to a control circuit 590 of the image sensor system 201. The control circuit 590 receives the focus signals 592 and controls focusing mechanisms (e.g., a mechanical actuator) in the image sensors 202. The image sensor system 201 may include a single control circuit 590 or multiple control circuits 590 for controlling different types of image sensors 202. For a pair of auto-focus circuit 350 and image sensor 202, the auto-focus circuit 350 may determine focus data based on the image data generated by the image sensor 202.

An auto-focus circuit 350 may generate a focus signal 592 by, for example, using a phase detection technique that determines a phase shift among focus pixel values in the image data of the image sensor 202. The focus signal 592 generated by the auto-focus circuit 350 may be a direct control signal that is sent to the control circuit 590 or a signal that includes focus data for the control circuit 590 to generate a control signal.

By separating the auto-focus circuits 350 from the front-end pipeline stages 330, the back-end pipeline stages 340, and the image statistics circuit 304, the ISP 206 may advantageously process image data from one of the image sensors 202 while each of the auto-focus circuits 350 continues to process and generate focus signals 592 to send to the image sensor system 201 to control the lens position of its respective image sensor 202. While ISP 206 shown in FIG. 5 has a separate auto-focus circuit 350 for each image sensor 202, in some embodiments one or more image sensors 202 may also share an auto-focus circuit 350 that is separate from the image statistics circuit 304 and from other image processing circuits of ISP 206. When multiple auto-focus circuits 350 are provided to control each image sensor 202, each of the auto-focus circuits 350 may continue to maintain a corresponding image sensor in focus regardless of which image sensor 202 is providing the raw image data for further processing by other pipelines of the ISP 206. Hence, whenever a switch is made from one image sensor 202 to another image sensor 202, the switched image sensor remains in focus and provides in-focus raw image data without delay.

In one embodiment, an auto-focus circuit 350 includes, among other components, a crop (CROP) circuit 510, a patterned defect pixels (PDP) processing circuit 520, a gain offset clamp (GOC) circuit 530, an auto-focus engine (AFE) circuit 540, a subsample binner (SBIN) circuit 550, a radial vignetting correction (RVC) circuit 560, a histogram (HIST) generation circuit 570, and a min max sum (MIMS) circuit 580. The auto-focus circuits 350 in various embodiments may include different, fewer or additional circuit units. Also, depending on embodiments, fewer or more than two auto-focus circuits 350, each with the same or different components, may be provided.

The crop (CROP) circuit 510 is a circuit that reduces the size of the raw image data by cropping the raw image data. To reduce consumed resources (e.g., power and memory) associated with processing the raw image data, the CROP circuit 510 crops the raw image data to a reduced size. The CROP circuit 510 may operate in different modes. For example, one of the modes may enable selective processing of parts of the raw image data. In another operation mode, the cropping operation may start at a location and continue in a horizontal direction or in a vertical direction. In yet another operation mode, the cropping operation may crop the image based on a frame width or frame height of a plurality number of pixels. In some embodiments, the crop circuit may be bypassed.

The patterned defect pixels (PDP) processing circuit 520 is a circuit that identifies and processes focus pixels in the raw image data. The PDP processing circuit 520 receives a cropped or original raw image data with known focus pixel locations in the received image data. The locations of focus pixels may be predetermined by the placement of focus pixels in the image sensor pixel array. Focus pixels 440 may have lower color values compared to ordinary pixels since focus pixels are partially covered. After the PDP processing circuit 520 identifies focus pixels, the color values of these pixels may be increased relative to color values of ordinary pixels.

The gain offset clamp (GOC) circuit 530 is a circuit that performs a black level compensation for each color component in the raw image data. An image sensor 202 may include image sensing units that have an inherent noise level that results in a non-zero (positive or negative) reading even if the image sensor 202 is completely blocked from light exposure. An offset operation may be performed at the image sensor 202 based on the black level noise so that the output of the image sensor becomes positive. For this purpose, the GOC circuit 530 may perform linear transformation operations and clipping to an input image to remove the offset effect performed at the image sensor 202 and also keep the saturation level of the image at the same level.

The auto-focus engine (AFE) circuit 540 is a circuit that generates the focus signal 592 for the image sensor 202 to cause the corresponding image sensor 202 to change its lens position. The AFE circuit 540 may receive a version of the raw image data processed by the PDP processing circuit 520 and GOC circuit 530. The AFE circuit 540 may perform pixel corrections for the focus pixel values to calculate what the pixel values would be if the portions of focus pixels were not blocked from light exposure. The pixel correction for a focus pixel value may be performed by processing the focus pixel value to neighboring image pixel values. After the focus pixel values are corrected, the AFE circuit 540 may determine a phase shift among focus pixel values in the image data. Because different portions of different focus pixels are blocked from light exposure in the image sensor 202, the angle of each of the different focus pixels in capturing an image is slightly different. Thus, a disparity in the form of phase shift exists among the focus pixel values. For example, in one embodiment, the AFE circuit 540 may select, from the plurality of focus pixel values extracted in the PDP processing circuit 520, a first focus pixel value that corresponds to a first focus pixel with a first portion blocked from light exposure. The AFE circuit 540 may calculate a first corrected focus pixel value that estimates the first focus pixel value if the first portion were not blocked. Likewise, the AFE circuit 540 may select, from the plurality of focus pixel values, a second focus pixel value that corresponds to a second focus pixel with a second portion blocked from light exposure. The second portion may be different from a corresponding portion blocked in the first focus pixel. For example, the first focus pixel may be blocked from the left side and the second focus pixel may be blocked from the right side. The AFE circuit 540 may calculate a second focus pixel value that estimates the second focus pixel value if the second portion were not blocked. The AFE circuit 540 may determine a phase shift from a difference between the first and the second focus pixel values. In another embodiment, the AFE circuit 540 may determine a phase shift from a difference between a focus pixel value and its corrected pixel value. Based on the phase shift, the AFE circuit 540 may generate the focus signal 592 that causes the image sensor 202 to change the lens position.

In some embodiments, the pipeline of an auto-focus circuit 350 is completed after the AFE circuit 540. In other embodiments, other auto-focus circuits 350 may include more downstream circuits to perform other operations and signal processing on the image data for controlling other aspects of image sensors. For example, the auto-focus circuits 350, which are separate from the image statistics circuit 304, may include their own statistics units that generate various statistics that are relevant to the control of the image sensors, such as statistics related to exposures of the image sensors. Hence, the independent auto-focus circuit pipelines that are separate from the main image statistics circuit 304 and other image processing pipelines allow the ISP 206 to control other aspects of the image sensors 202 while the image sensors 202 are in standby. For example, the exposure statistics allows image sensors 202 to have the right levels of ISO, shutter speed or aperture size on top of the right lens position even though the image sensors 202 are in standby. Hence, the images displayed at the touch screen 150 may transition seamlessly without a sudden change in contrast or brightness level when the active image sensor 202 changes from one sensor to another.

In one embodiment, an auto-focus circuit 350 includes an SBIN circuit 550, an RVC circuit 560, a HIST generation circuit 570, and an MMS circuit 580 that are designed for generating exposure statistics from the image data (e.g., a version of the raw image data) generated by an image sensor 202.

The subsample binner (SBIN) circuit 550 down-samples the raw image data to reduce the pixel rate of the images. The SBIN circuit 550 converts a version of the raw image data to an output image that allows a downstream statistics circuit 565 to generate statistics on a version of the output image of the SBIN circuit 550. The version of the raw image data may be an unprocessed raw image data or a version that is adjusted by one or more circuit units such as the CROP circuit 510, the PDP processing circuit 520, the GOC circuit 530, and the AFE circuit 540. The statistics circuit 565 may be operatively coupled to the SBIN circuit and may include the RVC circuit 560, the HIST generation circuit 570, and the MMS circuit 580. The down-sampling of the raw image data by the SBIN circuit 550 may include reducing the number of pixels in the output image compared to the input image. For example, each of the output pixel value may correspond to a plurality to input pixels in the raw image data. For example, for a down-sampling rate of eight to one, the SBIN circuit 550 down-samples two-pixel quads in the raw image data to a single value. The SBIN circuit 550 may also down-sample the raw image data using different methods.

A statistics circuit 565 may be coupled to the SBIN circuit 550 to receive the output image of the SBIN circuit 550 to generate various statistics of the output image. The statistics may represent the exposure level of the image sensor 202 that is connected to the auto-focus circuit 350. The statistics circuit 565 may generate different types of statistics using different circuit units such as the HIST generation circuit 570 and the MMS circuit 580.

The radial vignetting correction (RVC) circuit 560 may perform a vignetting correction to compensate for lens falloff before the image data is processed to generate any statistical datasets of the image data. An image sensor 202 may include a lens or another optical component reduces the light exposure of the image sensor near the edges such as at the corners. The RVC circuit 560 may apply gain to the pixel values at the edges or near the corner to compensate for the luminance fall-off. The RVC circuit 560 may apply a radial gain calculation, in which the pixel values are multiplied to different gain values that increase from the optical center of the input image.

After the output image of the SBIN circuit 550 is compensated for radial vignetting, one or more types of statistics data may be generated by different circuits. Example output datasets may include a statistical dataset that can be represented by a histogram and another statistical dataset that includes key metrics of the output image such as the minimum value, the maximum value, the sum of the values in the output image, and the sum of squares of the values within a subset of values such as within a rectangular window in the output image. The min max sum (MMS) circuit 580 may be a circuit that is designed to quickly generate those metrics. The histogram (HIST) generation circuit 570 generates a statistical dataset that can be represented by a color histogram. A color histogram provides a statistical distribution of color values in the output image of the SBIN circuit 550. The color histogram may have a certain number of bins such as 64 bins. A bin may be a discretization level of a certain range of the color value. The HIST generation circuit 570 may count the number of pixels that belong to each bin in the output image of the SBIN circuit 550 and store each of the individual counts in a register for the access of other circuits. Both the histogram statistical dataset and the min max sum statistical dataset may represent the exposure level of the image sensor 202. The control circuit 590, based on the statistical datasets, may control the ISO, shutter speed and aperture size of the image sensor 202 to adjust the exposure level.

Example Auto-Focus Processes

Figure 6:
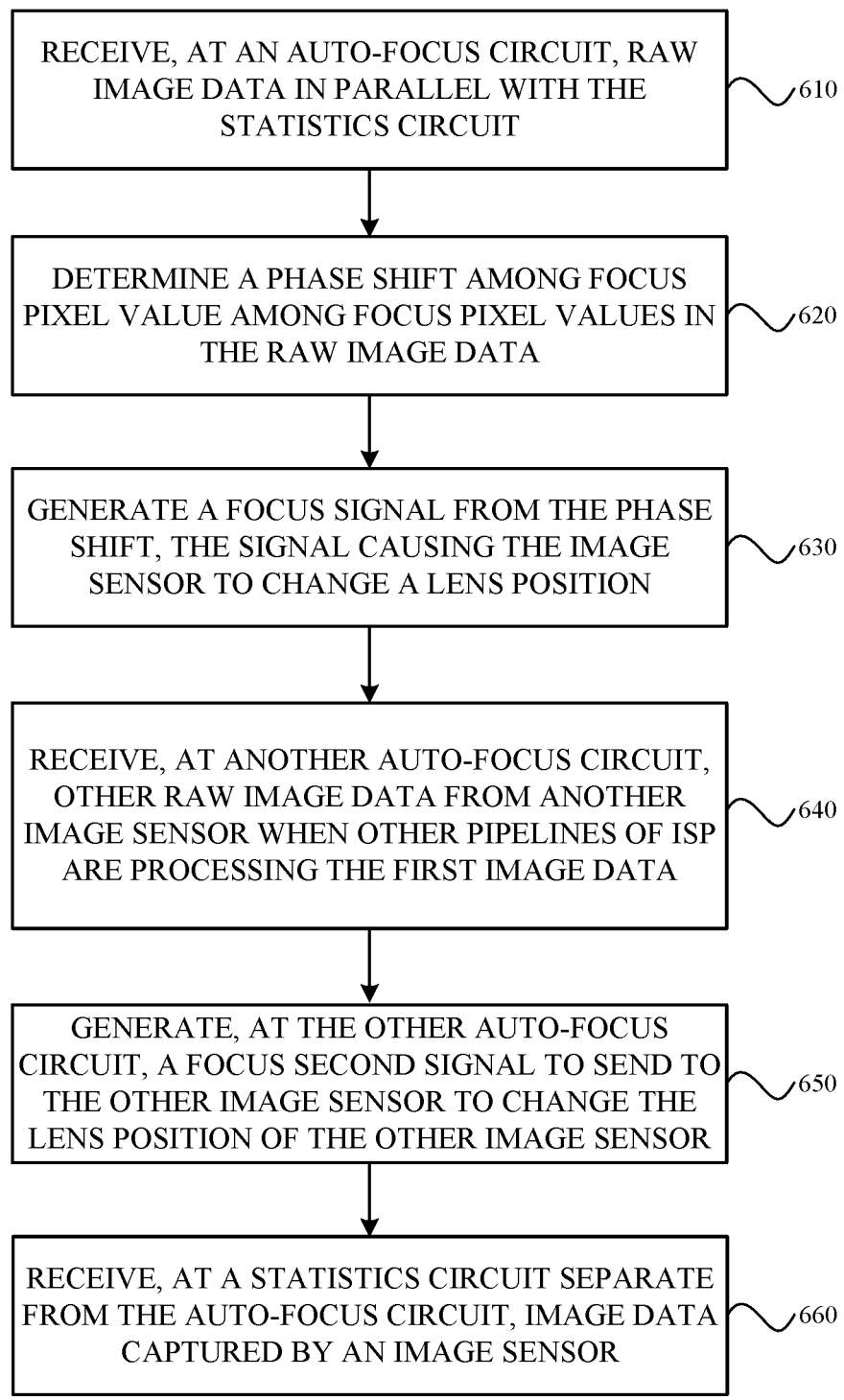
FIG. 6 is a flowchart illustrating a method of operating an image signal processor having an auto-focus circuit, according to one embodiment.

FIG. 6 is a flowchart depicting an example process that may be carried out by an image signal processor (ISP) of an electronic device, according to an embodiment. The ISP may receive 610, at an auto-focus circuit, raw image data from the image sensor. The auto-focus circuit of the ISP may determine 620 a phase shift among focus pixel values from the image sensor.

The determination of the phase shift may vary in different embodiments. In one embodiment, the determination of the phase shift may include identifying focus pixel values from the image data based on the known locations of the focus pixels. The determination of the phase shift may also include selecting, from the identified focus pixel values, a first focus pixel value corresponding to a first focus pixel with a first portion blocked from light exposure. The determination of the phase shift may further include selecting, from the identified focus pixel values, a second focus pixel value corresponding to a second focus pixel with a second portion blocked from light exposure. The second portion may be different from a corresponding portion blocked in the first focus pixel. The phase shift may be derived from a difference between the first and second focus pixel values.

In another embodiment, the determination of the phase shift may include selecting, from the identified focus pixel values, a focus pixel value corresponding to a focus pixel with a portion blocked from light exposure. The determination of the phase shift may also include calculating a corrected focus pixel value that estimates the focus pixel value of the focus pixel without the portion blocked. The calculating may be based on image pixels neighboring the focus pixel. The phase shift may be derived from a difference between the focus pixel value and the corrected focus pixel value. After the phase shift is determined, the ISP may generate 630 a focus signal based on the phase shift. The focus signal is sent to the image sensor to change the lens position.

The electronic device may include a single image sensor or multiple image sensors. In an embodiment that includes multiple image sensors, the ISP of the electronic device may include additional auto-focus circuits for processing raw image data from the image sensors. The ISP may receive 640, at another auto-focus circuit that is separate from the first auto-focus circuit, the other raw image data from another image sensor when other pipelines of the ISP are processing the first raw image data. The first image sensor may be active while the other image sensor may be in standby. The other auto-focus circuit may process the other raw image data from the standby sensor when the statistics circuit is processing the raw image data from the active sensor. The other auto-focus circuit may generate 650 a second focus signal that causes the other image sensor to change a lens position of the other image sensor so that the standby image sensor may remain in focus during which the first image sensor is active.

The ISP may swap the active image sensor and the standby image sensor. The transition between two image sensors may be without delay because the lens positions and exposure levels of two image sensors are continuously adjusted even though one image sensor is in standby. The ISP may receive a command to switch from the first image sensor to the second image sensor. The command may be generated by a user action or may be generated by a processor (the ISP or another processor) of the electronic device. The ISP may activate the second image sensor by transmitting the raw image data of the second image sensor to other image processing pipelines of the ISP. The first auto-focus sensor may continue to receive the raw image data from the first image sensor that is now turned standby. The first auto-focus sensor may continue to adjust the lens position of the first image sensor when the second image sensor is active.

The ISP may receive 660, in parallel with the auto-focus circuits and at a statistics circuit of the ISP that is separate from the auto-focus circuits, the raw image data captured by the image sensor. The statistic circuit performs various operations to collect statistics information associated with the raw image data.

In this disclosure, different image processing circuits such as the auto-focus circuits and the statistics circuit may receive and process data in parallel. Also, two image sensors may change lens positions in parallel when one of the image sensors is active. In parallel does not necessarily imply that actions must be performed simultaneously. For example, in parallel processing does not imply that the raw image data must be received by both the statistics circuit and the auto-focus circuit at the same time. In parallel may refer to a configuration that neither the auto-focus circuit nor the statistics circuit that is separate from the auto-focus circuit relies on the output of each other. Put differently, the auto-focus circuit and the statistics circuit may perform computation separately and independently. Also, in parallel does not necessarily imply that the raw image data received by the statistics circuit and by the auto-focus circuit are identical. In one embodiment, the statistics circuit may receive a first processed version of the raw image data and the auto-focus circuit may receive a second processed version of the raw image data of the same image sensor. Likewise, when the two image sensors change lens positions, in parallel does not imply that the two image sensors must change their respective lens position simultaneously.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image signal processor, comprising:
   a first auto-focus circuit operably coupled to a first image sensor to receive raw image data captured by the first image sensor, the first auto-focus circuit configured to:
      determine a phase shift among focus pixel values in the raw image data, the focus pixel values representing pixel values from the focus pixels of the first image sensor, and
      generate, based on the phase shift, a signal sent to the first image sensor to change a lens position of the first image sensor;
   a statistics circuit separate from the first auto-focus circuit and configured to obtain statistical information on the raw image data by processing the raw image data; and
   a second auto-focus circuit separate from the statistics circuit, the second auto-focus circuit configured to generate a second signal sent to a second image sensor to change a lens position of the second image sensor, the second image sensor having a different focal length than the first image sensor.

2. The image signal processor of claim 1, wherein the statistics circuit and the first auto-focus circuit are configured to receive the raw image data from the first image sensor in parallel.

3. The image signal processor of claim 1, wherein the second signal sent to the second image sensor is generated based on second raw image data captured by the second image sensor.

4. The image signal processor of claim 1, wherein the statistics circuit is configured to process the raw image data from the first image sensor in parallel with operation of the first auto-focus circuit and the second auto-focus circuit.

5. The image signal processor of claim 1, wherein the second auto-focus circuit is configured to process other raw image data from the second image sensor when the first image sensor is active and the second image sensor is in standby.

6. The image signal processor of claim 1, wherein the first auto-focus circuit is further configured to:
   generate a statistical dataset of the raw image data to control an exposure time of the first image sensor.

7. The image signal processor of claim 6, wherein the statistical dataset is represented by a histogram.

8. The image signal processor of claim 6, wherein the first auto-focus circuit is further configured to:
   perform a vignetting correction to compensate for lens falloff before processing the raw image data to generate the statistical dataset of the raw image data.

9. The image signal processor of claim 1, wherein a portion of each of the focus pixels is blocked from light exposure, and the first auto-focus circuit is further configured to increase gains in the focus pixel values relative to pixel values of other pixels that are not focus pixels.

10. A method, comprising:
    receiving, at a first auto-focus circuit, raw image data from a first image sensor;
    determining a phase shift among focus pixel values in the raw image data, the focus pixel values representing pixel values from the focus pixels of the first image sensor;
    generating a signal from the phase shift, the signal sent to the first image sensor to change a lens position of the first image sensor;
    receiving, at a statistics circuit separate from the first auto-focus circuit, the raw image data;
    processing the raw image data at the statistics circuit to obtain statistical information on the raw image data; and
    generating, by a second auto-focus circuit separate from the statistics circuit, a second signal sent to a second image sensor to change a lens position of the second image sensor, the second image sensor having a different focal length than the first image sensor.

11. The method of claim 10, wherein the raw image data is received at the statistics circuit and at the first auto-focus circuit in parallel.

12. The method of claim 10, wherein determining the phase shift comprises:
    selecting, from the focus pixel values, a first focus pixel value corresponding to a first focus pixel with a first portion blocked from light exposure;
    selecting, from the focus pixel values, a second focus pixel value corresponding to a second focus pixel with a second portion blocked from light exposure, the second portion different from a corresponding portion blocked in the first focus pixel;

determining the phase shift derived from a difference between the first and second focus pixel values.

13. The method of claim 10, wherein determining the phase shift comprises:
selecting, from the focus pixel values, a focus pixel value corresponding to a focus pixel with a portion blocked from light exposure;
calculating a corrected focus pixel value that estimates the focus pixel value of the focus pixel without the portion blocked; and
determining the phase shift derived from a difference between the focus pixel value and the corrected focus pixel value.

14. The method of claim 10, wherein
the second signal sent to the second image sensor is generated based on second raw image data captured by the second image sensor.

15. The method of claim 14, wherein the second signal is generated when the first image sensor is active and the second image sensor is in standby.

16. The method of claim 15, further comprising:
receiving a command to switch from the first image sensor to the second image sensor;
receiving, at the statistics circuit, the second raw image data from the second image sensor;
receiving at the focus image circuit, the raw image data from the first image sensor; and
adjusting the lens position of the first image sensor when the second image sensor is active.

17. A system comprising:
a first image sensor configured to capture raw image data;
a second image sensor having a different focal length than the first image sensor; and
an image signal processor coupled to the first image sensor and the second image sensor, the image signal processor comprising:
a first auto-focus circuit operably coupled to the first image sensor to receive the raw image data captured by the first image sensor, the first auto-focus circuit configured to:
determine a phase shift among focus pixel values in the raw image data, the focus pixel values representing pixel values from the focus pixels of the first image sensor, and
generate a signal from the phase shift sent to the first image sensor to change a lens position of the first image sensor;
a statistics circuit separate from the first auto-focus circuit and configured to obtain statistical information on the raw image data by processing the raw image data; and
a second auto-focus circuit separate from the statistics circuit, the second auto-focus circuit configured to generate a second signal sent to the second image sensor to change a lens position of the second image sensor.

18. The system of claim 17, wherein the second signal sent to the second image sensor is generated based on second raw image data captured by the second image sensor.

19. The system of claim 18, wherein the statistics circuit is configured to process the raw image data from the first image sensor in parallel with the first auto-focus circuit processing the raw image data from the first image sensor and with the second auto-focus circuit processing second raw image data from the second image sensor.

20. The system of claim 18, wherein the first image sensor and the second image sensor are configured to change lens position in parallel when one of the first image sensor and the second image sensor is active.

* * * * *